United States Patent
Wisting

[15] 3,651,622
[45] Mar. 28, 1972

[54] MOISTURE ELIMINATING APPARATUS

[72] Inventor: Walter L. Wisting, Fairfield Pl., Madison, Conn. 06443

[22] Filed: Feb. 15, 1968

[21] Appl. No.: 705,707

Related U.S. Application Data

[63] Continuation-in-part of Ser. No. 461,587, May 17, 1965, Pat. No. 3,406,492, which is a continuation-in-part of Ser. No. 418,379, Dec. 4, 1964, abandoned, which is a continuation-in-part of Ser. No. 381,178, July 8, 1964, abandoned.

[52] U.S. Cl....................................55/404, 55/472, 55/478, 415/72, 415/199
[51] Int. Cl..........................................B01d 45/08
[58] Field of Search...............................230/134.2; 55/400–405, 467, 257, 230, 472, 478; 415/72, 199

[56] References Cited

UNITED STATES PATENTS

| | | | |
|---|---|---|---|
| 1,072,189 | 9/1913 | Sparks | 230/134.2 |
| 1,135,451 | 4/1915 | Heath | 230/134.2 |
| 1,136,827 | 4/1915 | Montgomery | 230/134.2 |
| 1,478,635 | 12/1923 | Cannon | 230/134.2 |
| 2,006,244 | 6/1935 | Kopsa | 55/403 |
| 2,494,772 | 1/1950 | McElroy | 230/117 |
| 2,859,831 | 11/1958 | Solnick et al. | 55/438 |
| 2,873,908 | 2/1959 | Powers | 55/467 |
| 3,141,750 | 7/1964 | Hungate | 55/257 |
| 602,868 | 4/1898 | Nilson | 55/504 |
| 922,516 | 5/1909 | Rockliff | 55/456 |
| 2,981,464 | 4/1961 | Omohundro | 415/68 |
| 3,406,498 | 10/1968 | Wisting | 55/467 |

*Primary Examiner*—Bernard Nozick
*Attorney*—Delio and Montgomery

[57] ABSTRACT

This disclosure relates to an apparatus for removing liquid from a gas stream. A fan is positioned within a casing before an outlet opening therein and arranged to be driven at very high speeds by the gas flow through the casing. Moisture particles in the gas stream strike the blades of the fan as it rotates and are centrifugally thrown directly to the walls of the casing. The blades of the fan are constructed with substantially planar surfaces which define direct paths for flow of gas therethrough.

5 Claims, 15 Drawing Figures

Patented March 28, 1972
3,651,622
4 Sheets-Sheet 1
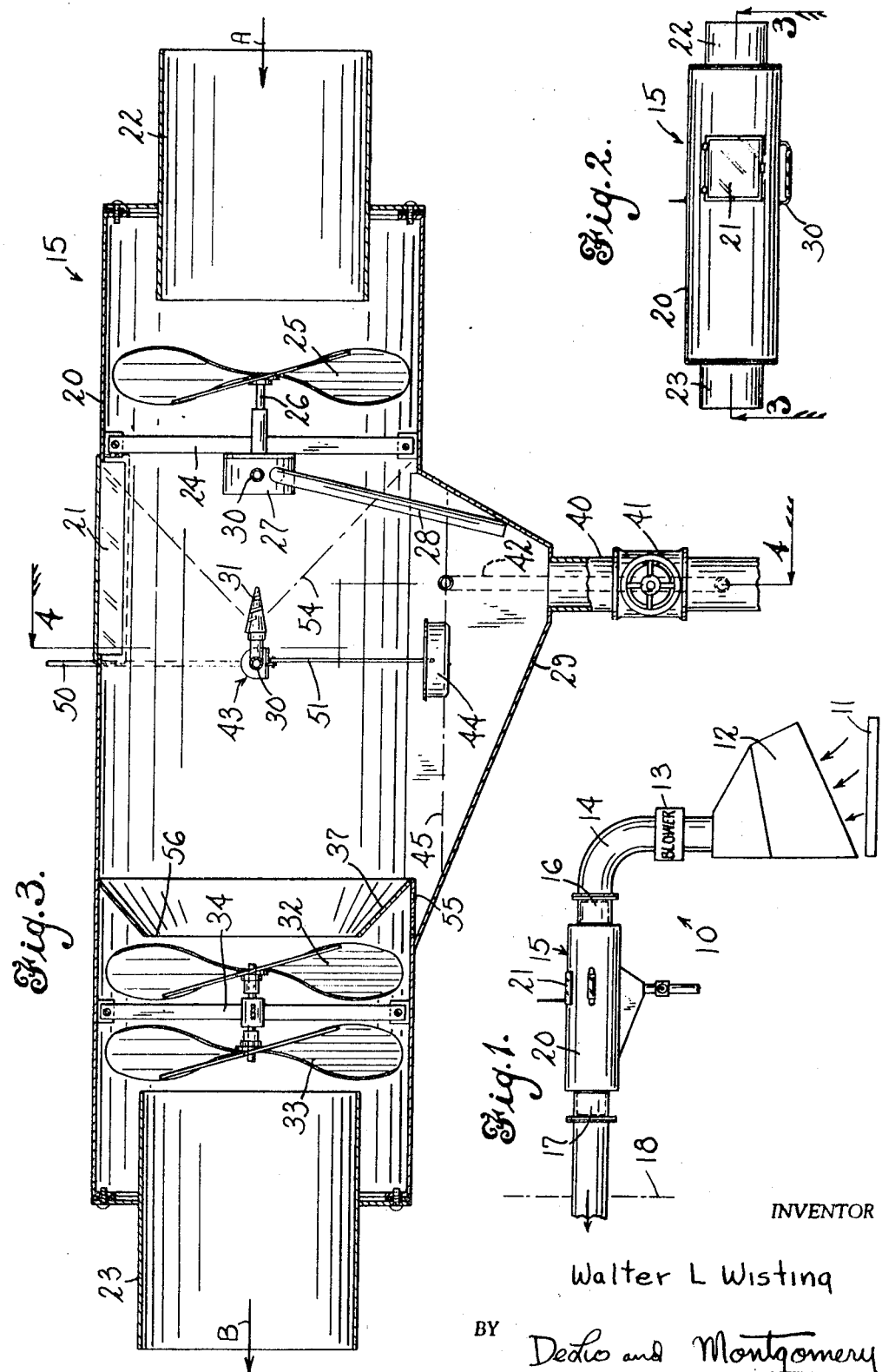
INVENTOR
Walter L Wisting
BY Dedio and Montgomery
ATTORNEYS

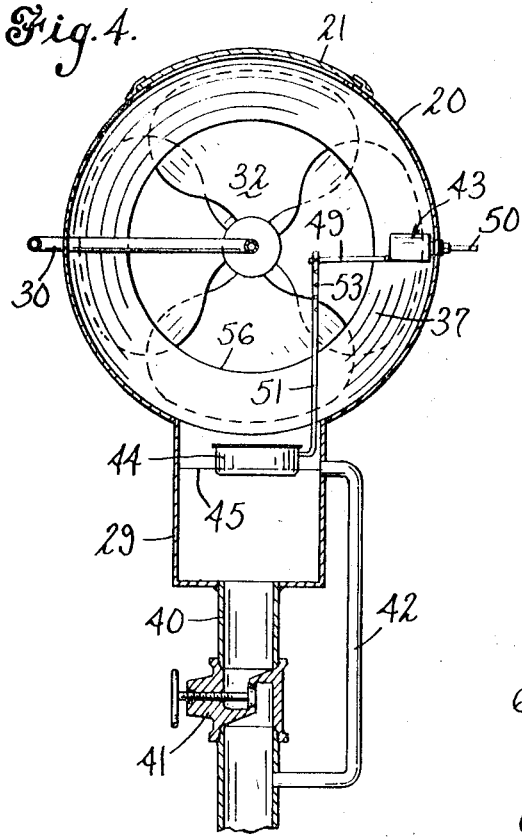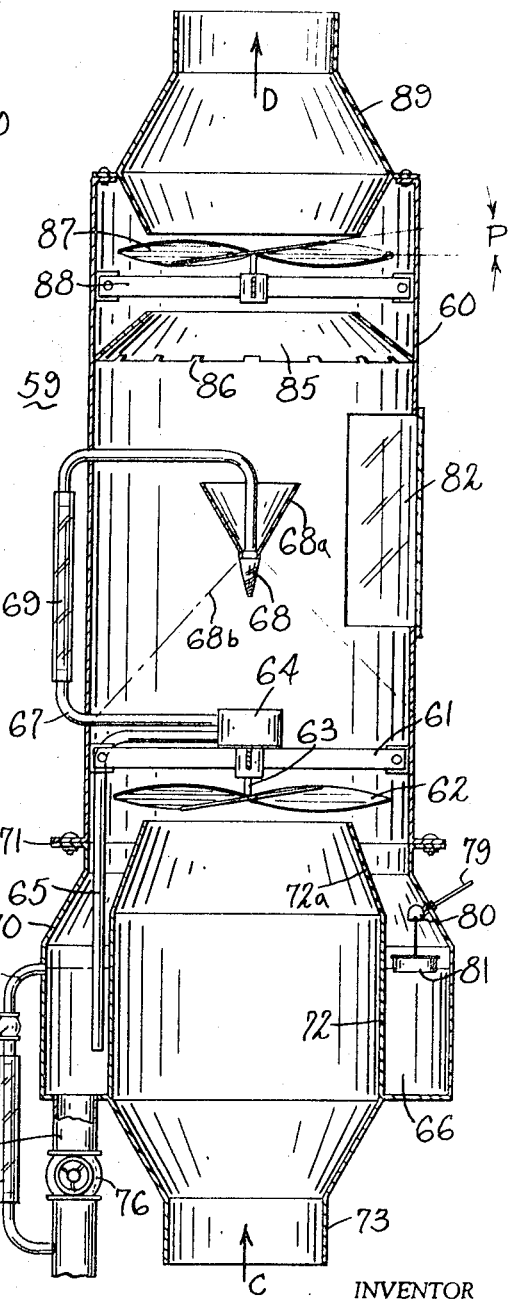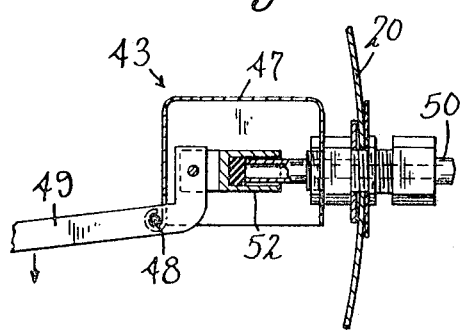

Patented March 28, 1972
3,651,622
4 Sheets-Sheet 3
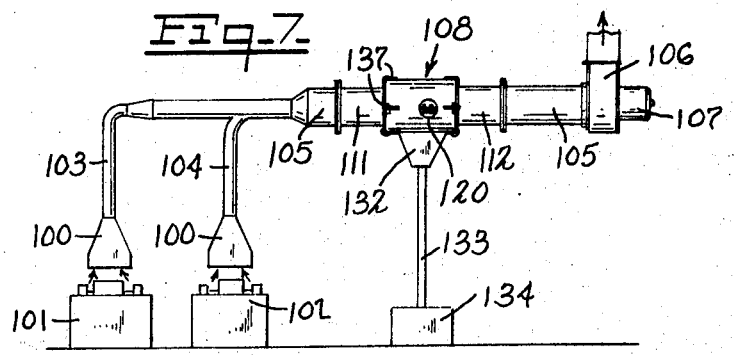
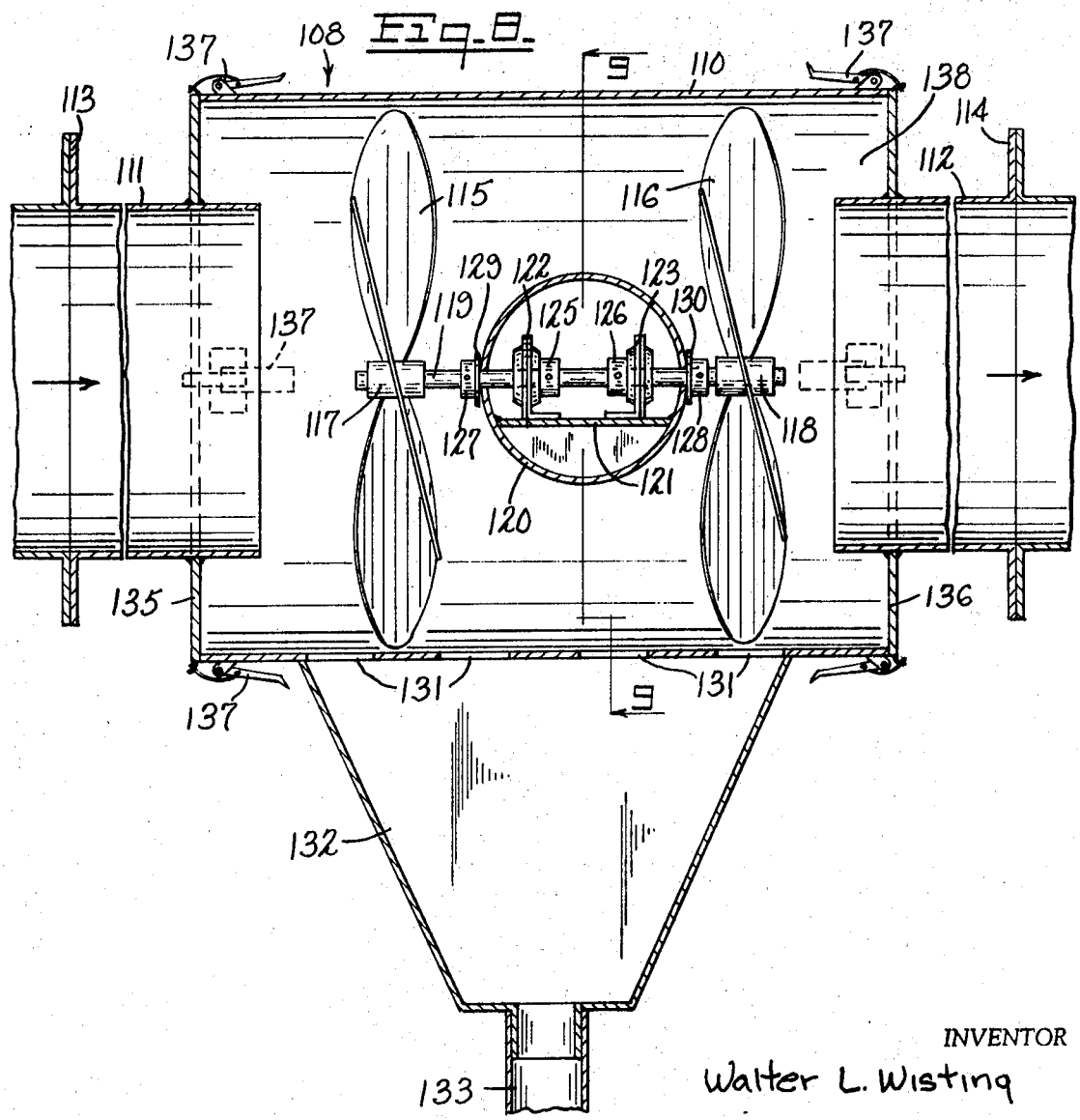
INVENTOR
Walter L. Wisting
BY Delio and Montgomery
ATTORNEYS

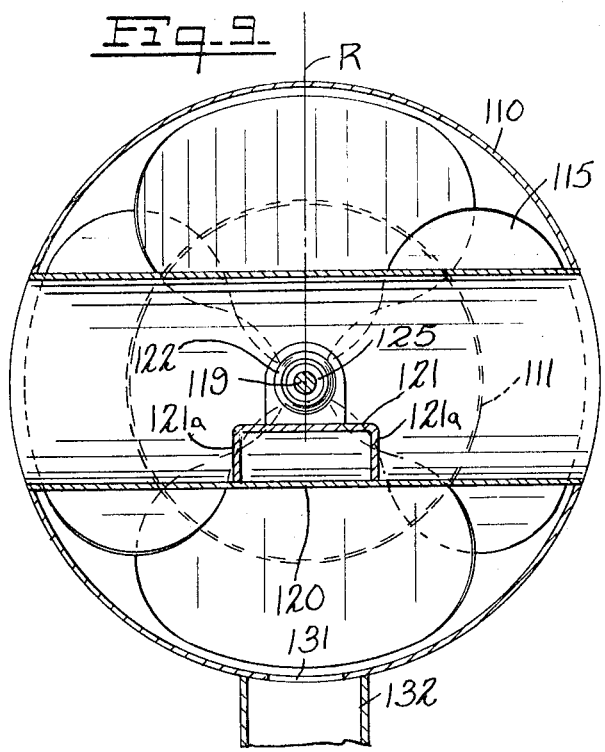
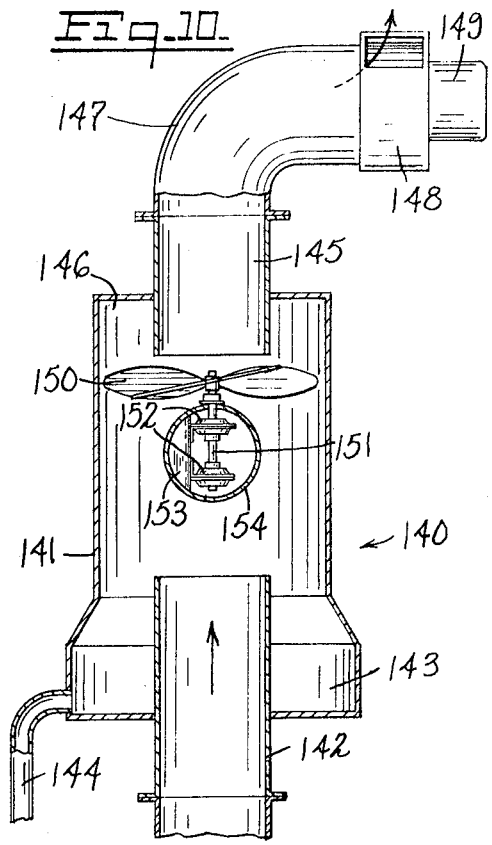
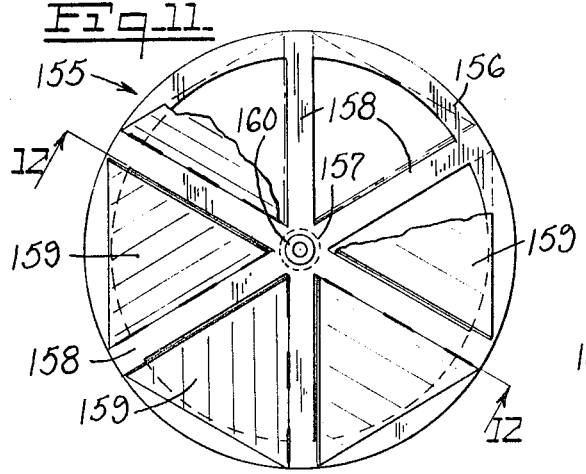
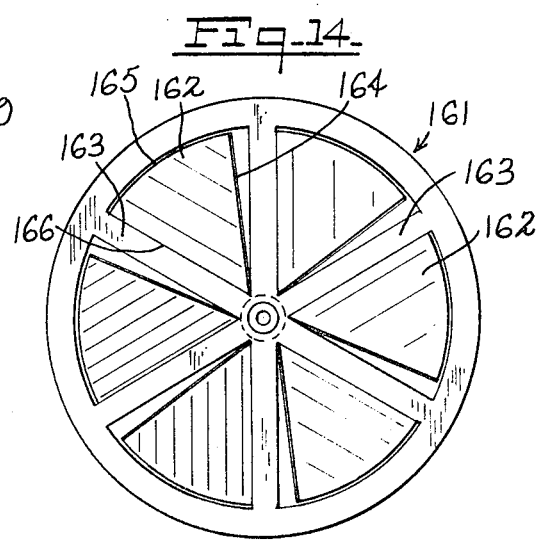
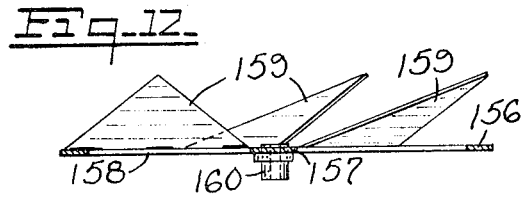
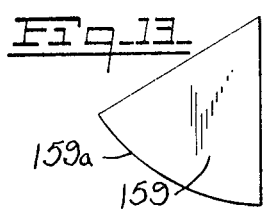
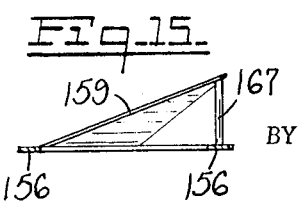

MOISTURE ELIMINATING APPARATUS

This application is a continuation-in-part of copending application Ser. No. 461,587, filed May 17, 1965 now U.S. Pat. No. 3,406,492 which is a continuation-in-part of copending applications, Ser. Nos. 418,379 and 381,178 filed Dec. 4, 1964 and July 8, 1964, respectively both now abandoned.

This invention relates to apparatus for treating gas, and more particularly relates to apparatus for removing liquid particles from a gas stream.

The invention may find wide application in apparatus designed to remove liquid from a gas stream as may be found in air washers, or oil mists, etc.

Air washers, also referred to as air "scrubbers" and dust and fume collectors, are known which are utilized to wash or scrub air to remove contamination therefrom by producing movement of the air through a chamber while spraying water into the air which collects or combines with the contaminants therein. The water particles are then carried by the moving air stream to some device or structural arrangement, such as filters or impingement baffles, which block or hamper passage of the heavier water particles while allowing passage of air. In some arrangements, the flow of air is caused to change direction so that the heavier water particles will continue in their direction of flow to an accumulator or sump.

These types of air washers using a tortuous air flow path, impingement baffles or filters to remove the water from the air have a common deficiency in that all the aforementioned arrangements produce an undesirable static head of pressure or pressure drop which requires the use of a larger air moving means to compensate for the pressure drop, or overcome the static head.

In some instances a rotating fan has been used to eliminate liquid from the gas as the liquid-laden gas exits the washer. For the most part such fans have required especially designed blades with tortuous paths between the blades and/or troughs or gutters on the blades designed to catch the liquid entrained in the gas, and prevent escape of the entrained gas from the washer. Such water eliminators have not proven efficient in preventing the exit of liquid from the device.

The present invention provides a new and improved air treating device which overcomes or greatly minimizes the aforementioned deficiencies and limitations of presently known devices for removing liquid from a gas stream. An air washer embodying the present invention suffers only a minimal static pressure drop through the air washer and minimizes water consumption.

A unit embodying the invention is completely self-contained and may be readily placed in an existing air cleaning system or incorporated in a new system. It may be designed for installation in either a vertical or horizontal arrangement to provide an overall linear flow of air therethrough. Moreover, a unit embodying the invention may be so constructed as to require no drive means within the unit and operate solely in response to air flow therethrough.

An object of this invention is to provide a new and improved device of the type described which is efficient in operation and requires no air filters, static impingement baffles nor tortuous gas-liquid separating passages.

Another object of this invention is to provide a new and improved device of the type described which may be easily installed in an existing section of duct without the necessity of complex fittings.

A further object of this invention is to provide a new and improved device of the type described wherein the moisture-laden air drives a fan which efficiently centrifugally separates the moisture from the air without establishing an undesirable static head of pressure and discharges clean air.

A still further object of this invention is to provide new and improved moisture eliminator fan constructions.

The features of the invention which are believed to be novel are set forth with particularity and distinctly claimed in the concluding portion of this specification. However, the invention both as to its organization and operation, together with further objects and advantages thereof, may best be appreciated by reference to the following detailed description taken in conjunction with the drawings, in which:

FIG. 1 is a view in elevation of an air treating system including a unit embodying the invention;

FIG. 2 is a plan view of the air treating unit of FIG. 1;

FIG. 3 is a longitudinal sectional view of the unit of FIG. 2, seen along section 3—3 of FIG. 2;

FIG. 4 is a cross-sectional view of the unit of FIGS. 2 and 3 seen along section 4—4 of FIG. 3;

FIG. 5 is a view, in section, of a float operated valve utilized in a unit embodying the invention;

FIG. 6 is an elevation in half section of an air washer unit embodying the invention which is arranged for a vertical installation;

FIG. 7 is a view in elevation of a moisture eliminator system which includes a unit embodying the invention;

FIG. 8 is a view in longitudinal half section of a moisture eliminator used in the system of FIG. 7;

FIG. 9 is a view seen in the plane of lines 9—9 of FIG. 8;

FIG. 10 is a view in half section of a unit embodying the invention arranged for vertical installation;

FIG. 11 is a plan view of a fan construction that may be used in any of the units of FIGS. 3, 6, 8 or 10;

FIG. 12 is a side view of the fan of FIG. 11;

FIG. 13 is a view showing an alternate fan blade configuration for the fan of FIG. 11;

FIG. 14 is a view similar to FIG. 11 showing another fan arrangement; and

FIG. 15 is a view similar to FIG. 12 showing an alternate fan construction.

An air washing or cleaning system 10 which may include a unit embodying the invention is generally illustrated in FIG. 1. The reference numeral 11 represents the top of an acid vat or bath. A hood 12 is positioned above the vat and the fumes therefrom are drawn up into the hood by a blower 13 in conduit or duct 14. An air washing unit 15 embodying the invention is positioned in duct 14 through suitable couplings 16 and 17. The duct 14 may then be directed through an exterior wall represented by the broken line 18.

The air washer exemplified in FIGS. 1 – 4 is arranged for horizontal installation and generally comprises a substantially cylindrical casing 20 having a length substantially greater than its diameter and having a transparent access and inspection door 21 therein which is also useful as an observation window for purposes hereinafter described. Air to be cleaned, represented by the arrow A, is directed into the casing at the inlet end thereof through an inlet conduit and mounting adapter member 22, and clean dry air is exhausted through the outlet end through an outlet conduit and mounting adapter 23 as represented by the arrow B. Both of conduits 22 and 23 are of lesser diameter than casing 20 and extend therein. Within the casing is a mounting bracket 24 preferably having four legs which rotatably mounts a first fan 25 having a plurality of blades extending radially therefrom. Fan 25 is positioned adjacent the inlet opening and is arranged to be driven by air flow through the unit. The span of the blades of fan 25 is greater than the diameter of conduit 22. Fan 25 rotates in a plane substantially perpendicular to the flow of air through the unit. The shaft 26 of fan 25 drives a pump 27 also carried by bracket 24. When pump 27 is operated it draws water through pipe 28 from reservoir or sump 29 which is positioned at the bottom of the cylindrical casing intermediate the ends thereof in open communication with the interior of casing 20. Pump 27 then supplies water under pressure through conduit or pipe 30 to a spray nozzle 31 which directs a mist or spray of particles of water into the incoming air stream and onto the blades of fan 25. The water droplets striking the blades of fan 25 move from one blade to the next as the fan rotates, and outwardly toward the casing by centrifugal action, as hereinafter explained. This creates a moving waterfall or screen of water drops or mist between the blades through which the incoming air must pass. Positioned adjacent the outlet end of casing 20 are fans 32 and 33 rotatably mounted from a bracket 34, similar to bracket 24. Fans 32 and 33 rotate in a plane substantially perpendicular to the impinging air flow. While two fans 32 and 33 are illustrated adjacent the exhaust openings it will be understood that one fan is usually sufficient. As seen in FIG. 4 the blades of fan 32, and also the blades of fan 33, are wide and in overlapping relationship so as not to provide a straight-through open path through the fan. The span of the blades of fan 32 is greater than the diameter of outlet conduit 23. A baffle 37 having a generally frustoconical configuration is positioned within casing 20 immediately before fan 32. Baffle 37 covers the open spaces between the fan blades toward the outer extremities, see FIG. 4 and provide a means of increasing the velocity of air flow in casing 20 prior to the eliminator fans, and therefore increase the velocity of the air impinging on fan 32. At the exhaust end of casing 20 there is positioned an outlet conduit and adapter 23 arranged to receive coupling members so that the unit 15 may be coupled into a duct as represented by the duct 14, FIG. 1. The adapters 22 and 23 are preferably coaxial with each other and with casing 20 to provide a generally linear overall path through the unit and minimize any pressure drop and buildup of a static pressure head. As illustrated, the inlet and outlet openings and also the opening in baffle 37 are all essentially the same.

Sump 29 is in open communication with the interior of casing 20 and has a drain pipe 40 connected thereto which includes a normally closed valve 41. As most clearly seen in FIG. 4 an overflow pipe 42 is provided in communication with sump 29 and bypasses valve 41 to drain pipe 40.

Means are provided to replenish and freshen the water in the sump 29 and allow the sump water to be continually changed to avoid undesired buildup of contamination. The last-mentioned means comprises float valve 43 and an actuating float 44. As most clearly shown in FIG. 5, valve 43 comprises a casing 47 which carries a pin member 48 about which is pivoted a lever 49. A lead-in pipe 50 from a fresh water supply (not shown) is suitably mounted on casing 20 and supports casing 47. Lever 49 is connected to a float stem 51 so that as float 44 rises or falls, stem 51 will pivot lever 49 about pin 48 and open or close valve portion 52. Assuming that the water level 45 falls, float 44 will follow the water level and turn lever 49 counterclockwise about pin 48 as indicated by arrow E causing valve portion 52 to open inlet pipe 50, and allow fresh water from the fresh water supply to spill into sump 29 to maintain a predetermined water level therein and provide a continuous change of water in sump 29. Lever 49 may be connected to stem 51 at a plurality of positions 53 to predetermine and control the rate at which water in sump 29 is changed. In operation, water in sump 29 will be drawn off through overflow pipe 42 and as float 44 moves downwardly, valve 43 through lever 49 is operated to supply fresh water into the sump. In this manner fresh water is supplied to sump 29 at a predetermined rate, which rate is selected in accordance with the degree of contaminants in the water in sump 29.

Consider now the operation of the unit described assuming that air is to be applied to the inlet end thereof under pressure from a blower 13, FIG. 1, which air contains a contaminant such as acid fumes. The air flow A impinging on fan 25 produces rotation thereof and has imparted thereto a helical component of motion, yet no appreciable static head of pressure is built up at the entrance to the unit. The blades of fan 25 are constructed similar to those of fan 32. As fan 25 is rotated it drives pump 27 which in turn draws water from sump 29 through pipe 28 and supplies water under pressure to nozzle 31. Nozzle 31 sprays water onto the blades of fan 25. As fan 25 rotates, fine drops of water are thrown from blade-to-blade and outwardly toward the casing to create a dynamically moving waterfall or screen through which the air to be washed must pass. As the contaminated air passes through this waterfall, the water particles combine with the air borne contaminants or fumes. The air passing fan 25 has imparted thereto a circular or helical component of motion which it retains moving through the spray from nozzle 31. Nozzle 31 produces a mist or spray of small particles of water generally indicated by the broken outline 54. The helical movement of air into the mist ensures greater exposure of the air to the water particles and more efficient combination of the water particles with contaminants carried by the air. Additionally, the velocity of the air decreases in the larger diameter casing 20. The particles of water in the mist combine with the acid fumes in the incoming air flow. The continuing air flow through casing 20 passes through baffle 37 which increases the velocity thereof and impinges on fan 32. The air flow impinging on the blades of fan 32 drives fan 32 at a speed proportional to the velocity thereof. The particles of water in the air which have collected the acid, on striking the blades of fan 32 are thrown off onto the inner walls of casing 20 and drain back to sump 29 through drain holes 55. Fan 32 and also 33 have no load thereon and operate at a very high speed. The washed or cleaned air with the acid fumes removed therefrom is then directed outwardly of casing 20 through outlet conduit 23.

It will be noted from observation of FIG. 4 that the blades of fan 32 essentially cover the opening 56 in baffle 37 and thereby prevent straight-through motion of contaminated air. Therefore, the air laden with small particles of water impinges on the blades of fan 32 and, being heavier than the air, are thrown off onto the walls of casing 20 due to the centrifugal force exerted thereon upon rotation of the fan blades, while the lighter air is directed past the fans. It will be understood that if desired fans 32 and 33 could be so positioned that their blades were 90° displaced and completely block the see-through openings between the blades near the hub of the fan. However, in view of the relatively small size of these openings as compared to the overall area of opening 56, this is not deemed necessary. Additionally, the fans 32 and 33, being free wheeling, may operate at very high speeds on the order of three thousand revolutions per minute, dependent of course on the velocity of the air impinging thereon. This speed is higher than that ordinarily obtained with direct drives. Moreover, the construction eliminates a fan drive means within the casing.

It is understood, of course, that the fan 32, and also fan 33, are driven by the flow of air through casing 20 which impinges on the blades thereof. All fans are mounted in the cylindrical casing with their axes of rotation substantially parallel to the overall direction of air flow through casing 20. It has been found in practice that a four-bladed fan having overlapping blades, as illustrated, and a blade pitch of substantially 23° gives the most satisfactory results.

The water particles flung from the blades of fans 32 and 33 could have a tendency to creep toward the outlet conduit under the influence of the air flow if it were not of decreased diameter and extending into casing 20 to provide an annular pocket or trap which collects water. The water thus collected drains back to the sump through drain holes 55.

The water which drains back to the sump from casing 20 contains the contaminant removed from the air introduced into the unit 15 and would tend to contaminate the water in sump 29. It has been found that in most instances the contaminants will either tend to float on the top of the water in sump 29 and be drawn off through drain pipe 42, or sink to the bottom of the sump.

Water particles from nozzle 31 striking the blades of fan 25 have imparted thereto two velocity components. One velocity component is tangential due to rotation of the blades, while the other velocity component is radial due to the centrifugal force exerted on the particles. Additionally, the water particles striking the fan break into smaller droplets having the same velocity components.

The resultant of these components is in the direction of movement of the fan and radially outwardly. But, the droplets are in the air stream moving in the passages between the fan blades, which air stream thus imparts another velocity component to the particles in a direction generally opposite the direction of rotation of the fan. As a result, the water particles then strike the next fan blade on the back thereof and the above-described motion is repeated until the particles move outwardly along succeeding fan blades and are thrown off to the inside of the casing.

It will be apparent that the number of blades an individual droplet of water will strike will be a function of its radial component of motion from blade to blade, and therefore a particle of water initially striking a blade near the hub of the fan will strike a greater number of blades before being centrifugally thrown off the fan, than a water particle initially striking a blade near the end thereof.

This action produces a screen of water particles or waterfall between the blades of the fan which moves in a direction opposed to the direction of rotation of the fan. This screen or waterfall is held in the air for a relatively long period of time and comprises a heavy uniform concentration of water particles through which the entering air must pass. The dynamic energy or velocity of the water particles further adds to the efficiency of the scrubbing action exerted on the air.

In the unit illustrated in FIGS. 3 and 4, the pump 27 provides a load on fan 25 and limits the rotational speed thereof to create and maintain the blade-to-blade water screen. If an external pump is used, other means as described in copending application Ser. No. 461,587 now U.S. Pat. No. 3,406,492 may be utilized.

The invention has thus far been disclosed in a horizontal application for removing acid fumes from air. The invention may also be embodied in an air washer arranged for a vertical installation.

An air washer arranged for a vertical installation is shown in FIG. 6 and comprises a cylindrical casing 60 having mounted therein a bracket 61 which rotatably supports a fan 62 thereon of the same configuration shown in FIG. 4. The shaft 63 of fan 62 drives a pump 64 which draws water through pipe 65 from reservoir or sump 66 and delivers the water to pipe 67 to spray or nozzle 68. Pipe 67 may be provided with a transparent sight portion 69 which is used to determine if the pump is operating. Optionally mounted on nozzle 68 is an impingement cone 68a, for purposes hereinafter described. The sump 66 is annular in shape and is partially defined by casing member 70 secured to casing 60 as at 71. Mounted within member 70 and further defining sump 66 is an inlet duct or conduit 72 providing a coupling mounting adapter 73 similar to adapters 22 and 23. Fan 62 is positioned immediately behind inlet duct 72 and the span of the blades thereof is greater than the diameter of the inlet conduit. Sump 66 is provided with a drain pipe 75 having a normally closed valve 76 therein similar to the arrangement shown in FIG. 3. An overflow pipe 77 bypasses valve 76 and may be provided with a sight glass 78. A valve 77a may be included in overflow pipe 77 to control the rate of overflow and therefore the rate at which fresh water is admitted. Fresh water may be admitted to sump 66 through an inlet pipe 79 controlled by a valve 80 actuated by float 81. In the same manner as previously explained in conjunction with FIGS. 3 – 5, casing 60 is provided with a covered opening 82 which may be transparent for inspection purposes. Mounted towards the exit end of casing 60 is a baffle 85 of frustoconical shape having apertures or notches 86 at the large diameter thereof for purposes hereinafter explained. A fan 87 is rotatably mounted on a bracket 88 carried by casing 60. Fan 87 is of the same configuration as fan 32 shown in FIG. 4 and baffle 85 is for the same purpose as baffle 37, FIGS. 3 and 4. A discharge conduit and mounting adapter 89 is mounted to casing 60 subsequent to fan 87.

The operation of air washer 59 is substantially similar to that of air washer 15. Air to be washed is forced or drawn in through conduit 72 as indicated by the arrow C and clean dry air is exhausted as represented by the arrow D. The air flow C impinging on fan 62 has substantially no straight-through path by virtue of the overlapping arrangement of the fan blades, and baffle 72a. Therefore, the air flow into casing 60 drives fan 62 and in turn drives pump 64 which supplies water to nozzle 68. Nozzle 68 produces a spray of fine drops of water as indicated by the lines 68b into the oncoming air flow and onto the blades of fan 62. The water droplets striking the blades of fan 62 are thrown from blade-to-blade and outwardly to the wall as previously described. This creates a rotating screen of water particles through which air entering the casing must pass. The tiny particles of water combine with or collect the contaminants in the air flow.

The water particles which strike fan 62 are eventually centrifugally thrown off from the blades of fan 62 onto the interior walls of the casing and will run down to sump 66. The moisture-laden air in continuing through casing 60 impinges upon the blades of fan 87, thereby rotating fan 87. The moisture particles striking the fan are centrifugally thrown off onto the interior walls of the casing and drain down the walls through apertures or recesses 86 to sump 66. The rate of change of water in sump 66 is controlled as previously explained in conjunction with FIGS. 3, 4 and 5 by overflow pipe 77 and valve 80, and also by valve 77a. The impingement cone 68a is provided to collect any dust or contaminants which do not combine with the air. This feature of construction is optional. When used the impingement cone is placed on a direct line with the pump 64 which may produce a "blind" area therebehind. Conduit 89 extends into casing 60 for the same reasons as described in conjunction with conduit 23.

Units embodying the invention are very efficient and compact and may be easily handled and installed either for a new installation or in existing ducts. For example, a unit as illustrated in FIG. 3 having a rating of 1,000 cubic feet per minute is only 60 inches long over inlet and outlet conduits 22 and 23. In this particular model the conduits 22 and 23 have a diameter of 8 inches and casing 20 has a diameter of 13 inches. With these dimensions the velocity of the air flow into the unit is 3,000 feet per minute, the velocity of the air flow through casing 21 is 1,100 feet per minute and the velocity of the exiting air is 3,000 feet per minute. A unit rated at 3,000 cubic feet per minute has the same overall dimension of 60 inches, diameters at conduits 22 and 23 of 12 inches, and diameters of casing 21 of 15 inches. Entrance and exiting air in the inlet and outlet conduits 22 and 23 has a velocity of approximately 4,000 feet per minute and the velocity of air in casing 21 which has a diameter of 15 inches is approximately 2,500 feet per minute. The unit rate at 1,000 cubic feet per minute has a dry weight of only approximately 85 pounds, and the sump extends approximately five inches below the main casing. All models are so constructed with relation to the volumetric air flow therethrough that the speed of the eliminator fan is very high, on the order of 1,500 – 3,000 revolutions per minute.

Tests have further shown that in dust collection a unit embodying the invention has been effective to remove particles of less than micron size. It is theorized that this is due to the high speed or rotation of the eliminator fan 87, FIG. 6. The eliminator fan, which is free wheeling, rotates at a very high speed and it is theorized that the high speed of rotation and the friction of the blades with the air produces a static electrical charge on the surface of the blades which collects the extremely small particles of dirt or dust which may travel through the scrubber fan and the spray area. Subsequently, it is believed that such small particles of dust which are electrostatically collected on the fan blades are collected by the moisture particles impinging on the blades of the eliminator fan and thrown therefrom with such water particles by the centrifugal force exerted on the water particles by the high speed of rotation of the eliminator fan.

For the most efficient operation, the first or scrubber fan preferably has overlapping blades as shown in FIG. 4 which are pitched between 18° and 25°. This allows the fans to be driven without building up undesired air resistance. Also, the blades then define a passage therebetween for air which imparts to the air a spiraling or helical motion as it moves through the spray zone created by the nozzle(s) to produce a more efficient washing action.

Additionally, the velocity of air flow through the casing is selected in accordance with the volumetric rate (cubic feet/minute) and the size of the unit and the elements thereof so that the air flow impinging on the second or eliminator fan drives this fan at a high speed of rotation to achieve very efficient elimination of water particles from the air.

The second or eliminator fan is similarly constructed with the blades pitched at an angle P (FIG. 6) of between 18° and 25° with respect to a plane perpendicular to the axis of rotation of the fan. The blades have substantially planar surfaces defining direct and non-tortuous passages therebetween. There are substantially no open spaces between the blades of the fan as viewed axially.

It will be apparent that the waterfall or water screen created between the blades of the first fan may be utilized to serve many useful purposes as heretofore described, and a unit embodying the invention is very efficient in its operation inasmuch as the air entering the casing is acted upon or acts upon the water in the moving screen immediately upon entering the casing. The air passing the first fan has imparted thereto a helical motion through a water spray zone, thus assuring increased exposure of the water to the air and vice versa. The air then moves on down the casing at decreased velocity due to the increased diameter of the casing to the eliminator fan which separates the finer particles of water carried by the air from the air. The distance between the first fan and the eliminator fan is preferably so chosen that the heavier particles of water will be out of the air stream by the time the air stream reaches the eliminator fan. It may be used to remove fumes from the air as specifically described. Also, it may be used to efficiently remove dust from the air, or to cool air or to cool water. Additionally, it may be used as an air cooler installed in front of air utilizing equipment to supply clean, dust-free air and thus eliminate static filters. It also may be so utilized that the exhausted clean air is retained within the building in which it is installed.

The moisture or mist eliminator assembly may also be utilized in a separate unit to eliminate moisture from a gas stream, such as oil mists.

FIG. 7 illustrates an environment where such application is desirable. Hoods 100 overlying devices such as machine tools 101 and 102, which use oil cutting lubricants, are connected via ducts 103 and 104 to a main duct 105. A blower 106 driven by a motor 107 draws air through hoods 100 and duct 105 to a discharge point. A unit 108 embodying the invention is connected in duct 105. Duct 105 may discharge through blower 106 back into the plant or may discharge through a perimeter wall as shown in FIG. 1 to the outside.

A unit 108 as shown in FIG. 8 is adapted to remove oil particles from the gas stream in duct 105. Unit 108 comprises a central casing 110 having coaxial inlet and outlet conduits 111 and 112 extending into casing 110 and defining inlet and outlet openings to and from casing 110. The conduits 111 and 112 are provided with coupling flanges 113 and 114, respectively, to couple to mating flanges carried by duct 105.

Rotatably mounted within casing 110 immediately adjacent the inlet and outlet openings are moisture eliminator fans 115 and 116. The blades of the fans are arranged and dimensioned so as to provide essentially no axially directed openings as more clearly shown in FIG. 9. The blades are pitched at an angle P (FIG. 6) of 18° to 25° and have substantially planar surfaces defining direct passages therebetween transverse to the axis of the fans. The blades radiate from the hubs 117 and 118, which are affixed to shaft 119.

A channel member 120 having an imperforate peripheral wall extends transversely and diametrically through casing 110. A platform 121 having depending flanges 121a contoured to fit the inner periphery of channel 120 supports thereon bearings 122 and 123 which rotatably support shaft 119. The shaft is located by collars 125 and 126, fast on the shaft. Additionally, the shaft is located by collars 127 and 128 which hold seals 129 and 130, respectively.

The casing 110 is cylindrical and has openings 131 defined in the bottom thereof communicating with a liquid collecting sump 132. Sump 132 is provided with a drain 133 which may lead to a receptacle 134 (FIG. 7) for collection and reuse of the liquid removed from the gas stream in duct 105.

The end plates 135 and 136 of casing 110 may be detachably secured thereto as by means of a plurality of toggle clamps 137 to permit easy assembly of the unit in an existing duct. In this arrangement the conduits 111 and 112 are carried by the end plates 135 and 136, respectively.

In this embodiment where the fans have four blades, one fan is disposed 45° with respect to the other on shaft 117. Therefore, the radial center line R (FIG. 9) of a blade on one fan is disposed essentially between the radial center lines of two blades on the other fan.

The casing and fans are so dimensioned with respect to the blower that the gas stream through duct 105 drives the fans in the range of 1,500-3,000 r.p.m. For example, in a unit rated at 2,000 cubic feet per minute, the diameter of casing 110 would be approximately 17 inches, the diameter of the inlet and outlet conduits 111 and 112 would be approximately 10 inches and the span of the fan blades would be approximately 16 inches. With these dimensions a flow rate of approximately 2,000 cubic feet per minute would produce rotation of the fans within the specified range. The moisture particles, in this case oil mist, impinging on the blades of the fans as they are driven at this high rate of speed are immediately centrifugally thrown off directly to the walls of the casing from whence the moisture runs down through apertures or openings 131 into sump 132 and drain 133. Conduit 112 extending in the casing 110 defines therewith an annular pocket 138 which catches any moisture particles that may creep by the edges of the blades of fan 116. The bottom portion of casing 110 is preferably made continuous with the apertures 131 defined therein so as to prevent any tendency for the gas stream passing through casing 110 to pick up moisture from sump 132. While this form of the invention has been specifically described in an environment of separating oil from an air oil mist, it is to be understood that the moisture eliminator may be used to eliminate any moisture from a gas stream. For example, in some instances it may be desired to design the units of FIGS. 3 and 6 such that the scrubbing action takes place in one unit and the moisture eliminating action takes place in another. As previously pointed out, only one eliminator fan may be utilized.

Another arrangement of the invention is shown in FIG. 10 adapted for vertical installation. This moisture eliminator 140 comprises a vertically disposed cylindrical casing 141 having an inlet conduit 142 which defines with the lower side walls of casing 141 an annular sump 143 about conduit 142. The lower portion of the wall of casing 141 may be flared outwardly to increase the volume of sump 143, if desired. A drain pipe 144 leads from sump 143 to a liquid collection or disposal device (not shown). Towards the upper end of the casing an outlet conduit 145 which extends into casing 141 and defines annular pocket 146 therewith is connected to duct 147 which includes a blower 148 and motor 149 for moving the gas stream through the unit. A fan 150 having blades spanning a greater dimension than the dimension across outlet conduit 145 is mounted on a shaft 151 which is rotatably mounted in bearings 152 carried on a platform 153 in channel 154. The inlet conduit 142 is further connected to duct 147 and receives through duct 147 the gas stream containing the moisture to be eliminated. In operation, as the moisture laden gas stream flows into the unit it impinges on fan 150 and drives it at a very high speed. The moisture particles in the gas stream are thus thrown off to the side walls of casing 141 and run down the walls thereof to sump 143 and, hence, pass through drain 144. The dimensions of the casing and conduits and the speed of the fan in relation to the flow rate of the gas therethrough is selected as previously described and the fan and the blades thereof are constructed as previously described.

In this embodiment and that shown in FIGS. 8 and 9, the fan shafts are rotatably mounted within a channel extending through the unit to protect the bearings from any contaminants in the gas stream. With this arrangement, the bearings may be of the sealed type which require no lubricants or, if desired, the bearings may be of the lubricating type, in which case access may be had to the bearings through the channel.

Where the fans are to operate at the higher end of the speed range, say, 2,500 r.p.m. and above, it may be desirable to provide a reinforced fan blade construction.

A fan constructed in accordance with the invention which is adapted to withstand high speeds of rotation, yet present a minimum static pressure loss, is illustrated in FIG. 11. The fan 155 is formed with an outer ring 156, a central portion 157 and a plurality of equiangularly spaced arms 158 extending therebetween. The blades of the fan are generally triangularly shaped having three edges. Each of the blades 159 is welded or otherwise joined along one of its side edges to one of arms 158. The blades are pitched so that the total of the openings therebetween as measured in a plane parallel to the axis of the fan and in the triangular space defined by one of arms 158 and the free end of the blade in said parallel plane all total approximately the same cross-sectional area as the main portion of the outlet conduits. Such pitching of the blades will reside in the range of 18° to 25°.

As shown in FIG. 11, the size of the blades are so selected that there are no direct axial openings through the fan blades, and the paths defined through the fan blades are transverse to the axis of rotation and direct therethrough without any tortuous path. When utilized as shown in the units previously described, the fan 155 is mounted to a shaft at the central or hub portion 160 thereof which shaft may then be rotatably mounted in a manner previously described.

If desired, the blades 159 may be formed with the outer edges 159a thereof on a radius as shown in FIG. 13.

An alternate construction of this fan is exemplified in FIG. 14. Fan 161 is constructed and arranged in a manner similar to that of fan 155 differing only in that the blades 162 thereof are integrally formed with the arms 163. The fan 161 may be formed such that one edge 164 of the blades and the outer periphery 165 thereof are sheared or stamped from a disc. Then the fan blades are bent out along the line 166 to the desired angle. It will be seen that this construction leaves very small openings in the axial direction. However, at high speeds of rotation essentially no moisture particles will pass through the blades of the fan, only moisture particles will impinge on the fan and be thrown directly to the walls of the casing by centrifugal force.

The fans of FIGS. 11 – 14 may be constructed or fabricated from sheet material which may be either metal or nonmetallic. In some instances, it may be desirable to connect the outer extremity of the fan blades to the annular ring 156 as by means of a pin 167 as shown in FIG. 15. This construction further reinforces the free outer corner of the blade, and may be desirable where nonmetallic material is used to construct the fan. The pin 167 may connect and space the blade either with respect to one of the radial arms or the peripheral ring.

The operation of the fans of FIGS. 11 – 15 is the same as those previously described in the units of FIGS. 8 and 10.

It may thus be seen that the objects of the invention set forth as well as those made apparent from the foregoing description are efficiently attained. While preferred embodiments of the invention have been set forth for purposes of disclosure, modification to the disclosed embodiments of the invention as well as other embodiments thereof may occur to those skilled in the art. Accordingly, the appended claims are intended to cover all embodiments of the invention and modifications to the disclosed embodiments which do not depart from the spirit and scope of the invention.

What is claimed is:

1. An apparatus for removing entrained liquid from a gas stream passing therethrough comprising a cylindrical casing having inlet and outlet openings at opposite ends thereof, means for moving a gas stream through said casing, an eliminator fan rotatably mounted in said casing immediately before said outlet opening about an axis essentially coaxial with said outlet opening, said fan having a plurality of radially extending blades, said blades spanning a dimension greater than the dimension of said outlet opening said fan being freely rotatable and arranged to be driven by the gas stream impinging thereon, so that when the means for moving moves gas through said casing the gas stream impinging on said fan rotatably drives said fan and liquid particles impinging on said fan are centrifugally thrown directly to the walls of said casing, a shaft, said fan being mounted to said shaft, a hollow channel member having an imperforate peripherall wall extending transversely through said casing substantially diametrically thereof, shaft mounting means carried within said channel, said shaft being rotatably mounted in said shaft mounting means within said channel.

2. The apparatus of claim 1 further including means defining a liquid receiving sump at the bottom of and exterior to said casing, and a plurality of apertures defined in the lower wall of said casing to permit liquid thrown from said fan to drain to said sump.

3. An apparatus for removing entrained liquid from a gas stream passing therethrough comprising a cylindrical casing having inlet and outlet openings at opposite ends thereof, first and second eliminator fans rotatably mounted in said casing about an axis essentially coaxial with said openings, a hollow channel member extending through said casing substantially diametrically thereof, shaft mounting means carried in said channel member, and a shaft rotatably carried by said mounting means and extending through opposite sides of said channel member, said first and second fans mounted to opposite ends of said shaft.

4. The apparatus of claim 3 further including means defining a liquid receiving sump at the lower portion of said casing and a plurality of apertures defined in the lower portion of said casing to permit liquid thrown from said fans to drain to said sump.

5. The apparatus of claim 3 wherein said fans are mounted to said shaft such that the radial center line of the blades of one of said fans resides between the radial center lines of two blades of the other fan as viewed axially of the casing, said fans being rotated by gas flow through said casing.

* * * * *